United States Patent [19]

Hannah

[11] Patent Number: 5,038,297
[45] Date of Patent: Aug. 6, 1991

[54] METHOD AND APPARATUS FOR CLEARING A REGION OF Z-BUFFER

[75] Inventor: Marc R. Hannah, Menlo Park, Calif.

[73] Assignee: Silicon Graphics, Inc., Mountain View, Calif.

[21] Appl. No.: 614,981

[22] Filed: Nov. 16, 1990

Related U.S. Application Data

[63] Continuation of Ser. No. 527,644, May 22, 1990, abandoned, which is a continuation of Ser. No. 243,789, Sep. 13, 1988, abandoned.

[51] Int. Cl.⁵ .............. G06F 12/06; G06F 15/72; G09G 5/36; G09G 1/02
[52] U.S. Cl. .................. 364/518; 364/522; 340/799; 340/729
[58] Field of Search ........... 364/518, 522, 521; 340/729, 747, 799, 798

[56] References Cited

U.S. PATENT DOCUMENTS

| | | | |
|---|---|---|---|
| 4,016,544 | 4/1977 | Morita et al. | 340/747 X |
| 4,609,917 | 9/1986 | Shen | 340/729 |
| 4,689,677 | 8/1987 | Hedley et al. | 358/160 |
| 4,701,863 | 10/1987 | Bruce | 364/518 |
| 4,725,987 | 2/1988 | Cates | 364/518 |
| 4,924,415 | 5/1990 | Winser | 364/522 |
| 4,951,232 | 8/1990 | Hannah | 364/522 |
| 4,961,153 | 10/1990 | Fredrickson et al. | 364/521 |

*Primary Examiner*—Gary V. Harkcom
*Assistant Examiner*—Raymond J. Bayerl
*Attorney, Agent, or Firm*—Blakely, Sokoloff, Taylor & Zafman

[57] ABSTRACT

A method and apparatus for clearing a Z-buffer in a raster scanned, computer controlled video display system having a frame buffer and a Z-buffer is disclosed. The method includes the step of writing a plurality of bits into pixel locations of the frame buffer, which pixel locations will be cleared in the Z-buffer and on the screen of the video display. Those plurality of bits invalidating the Z values in the Z-buffer corresponding to those pixel locations.

1 Claim, 3 Drawing Sheets

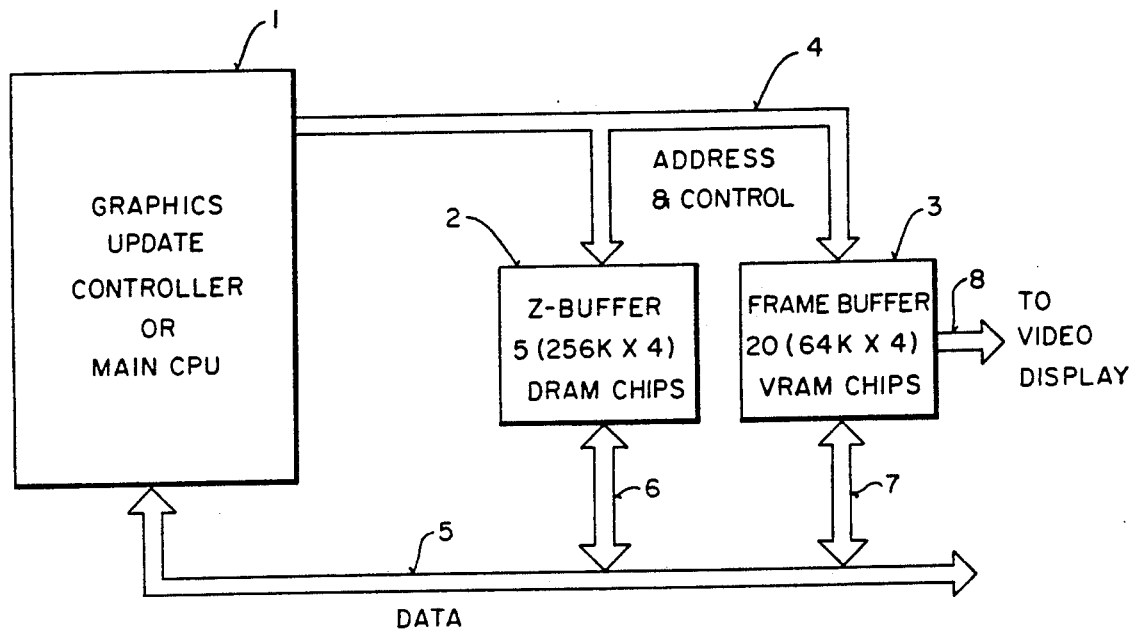
FIG_1 (PRIOR ART)
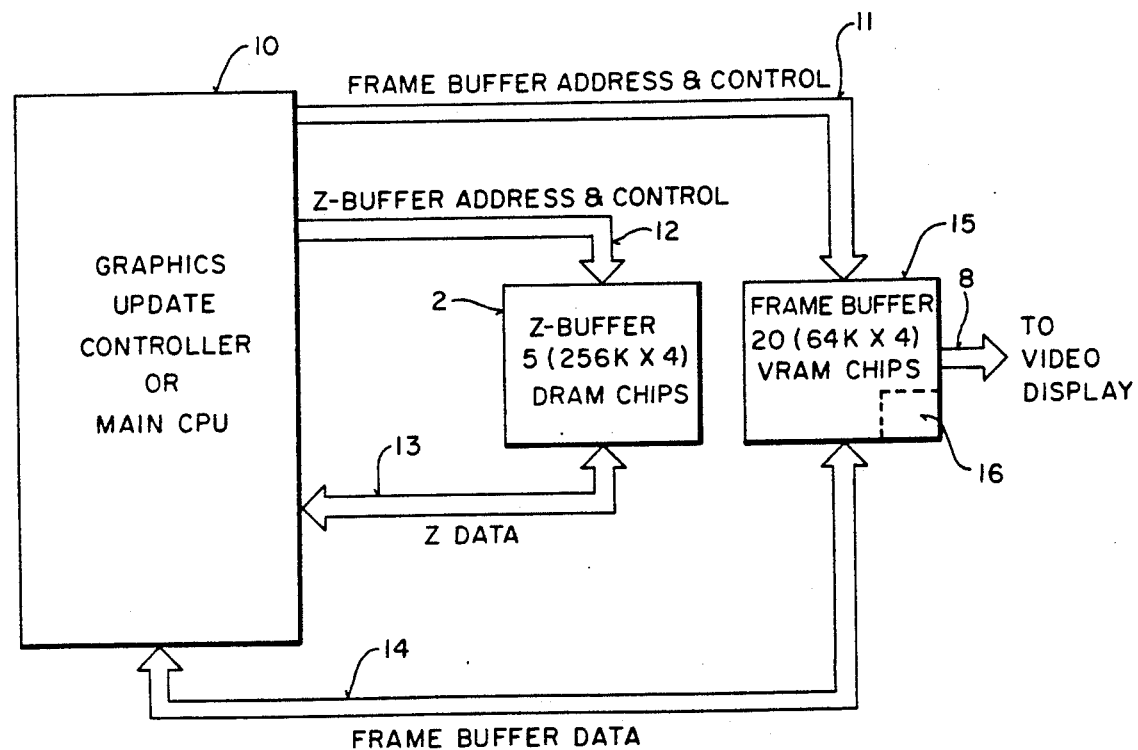
FIG_2

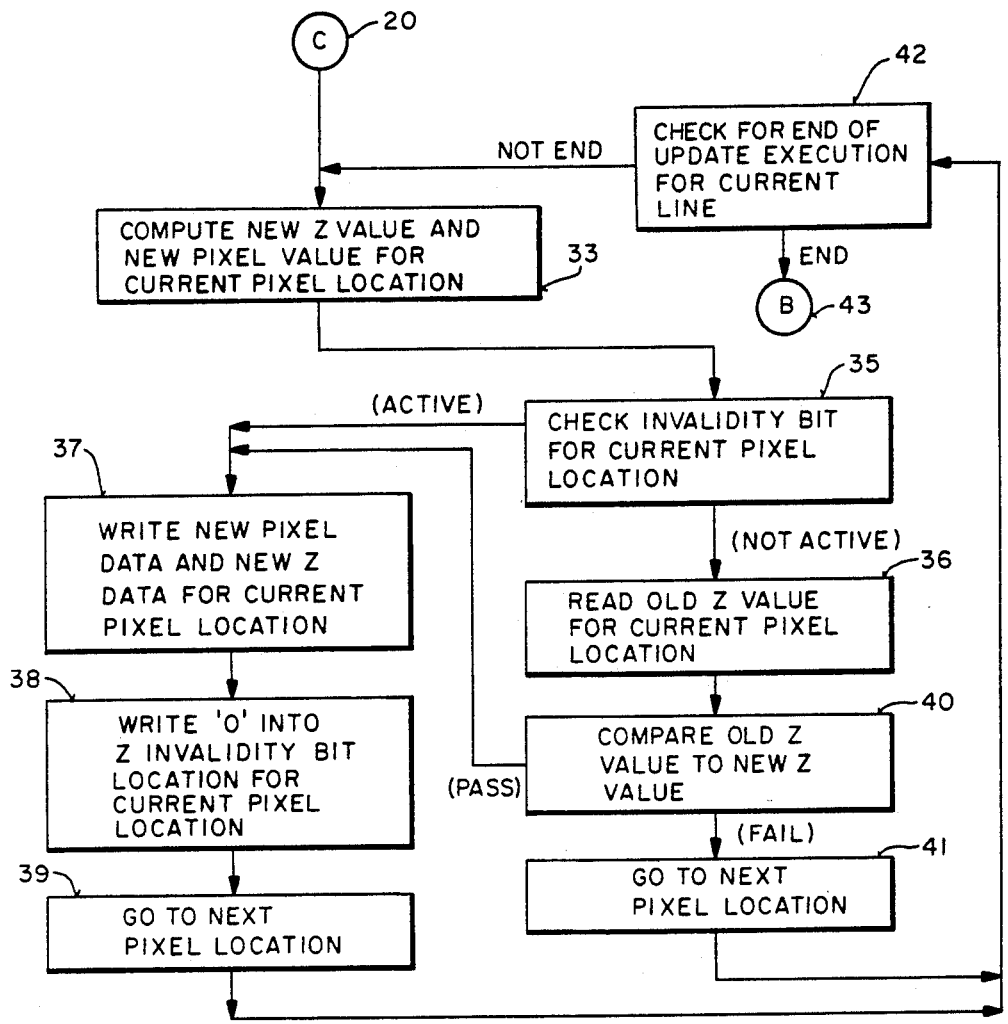
FIG_3
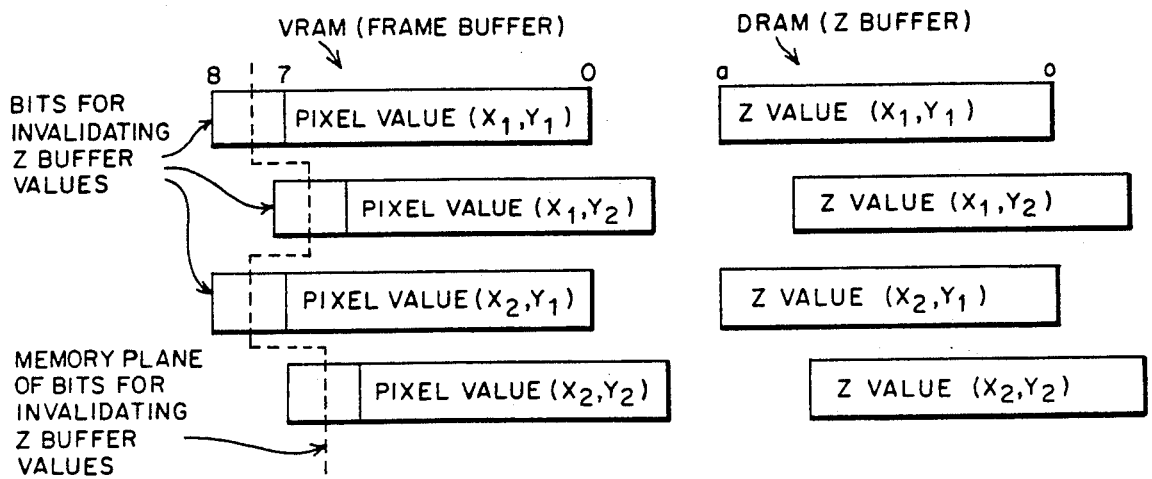
FIG_4

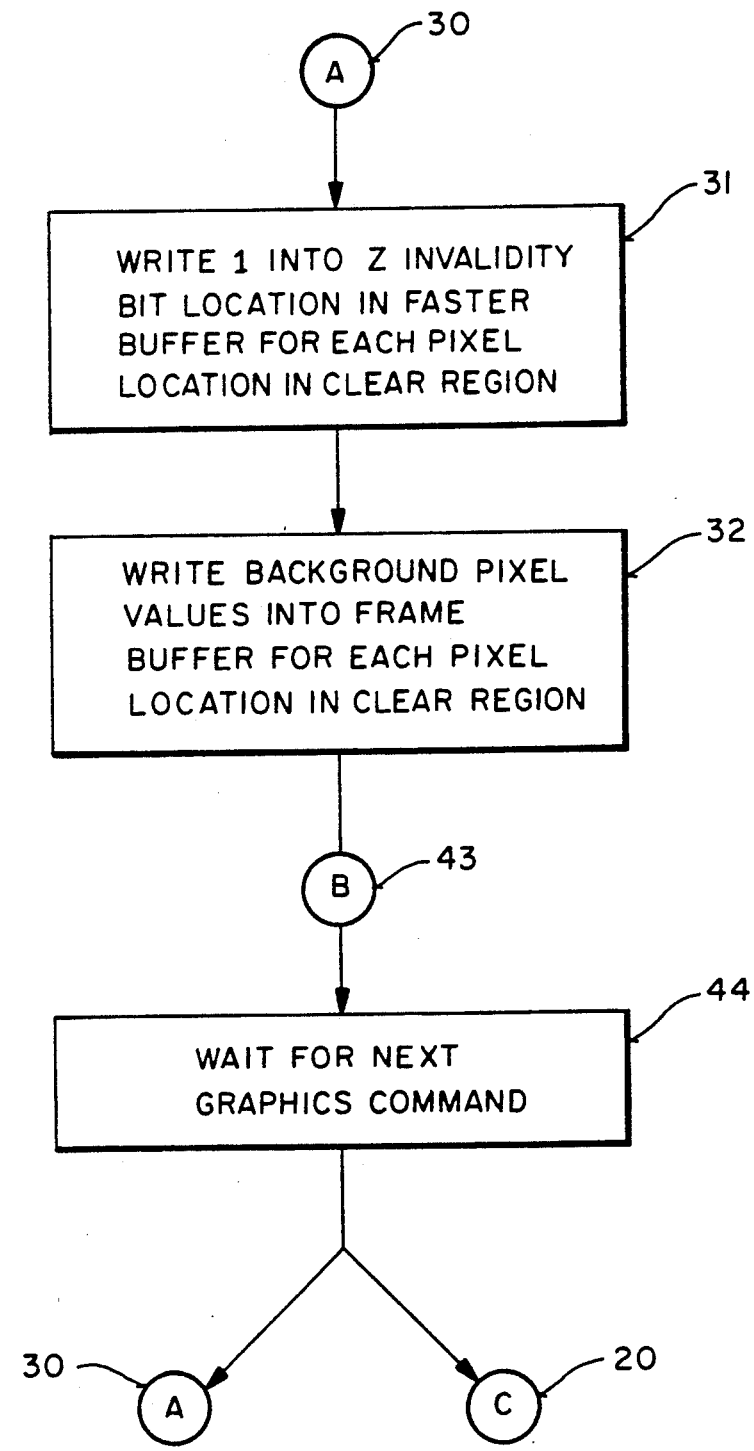
FIG _ 5

METHOD AND APPARATUS FOR CLEARING A REGION OF Z-BUFFER

This is a continuation of application of Ser. No. 527,644, filed 5-22-90, now abandoned which is a continuation of application Ser. No. 243,789 filed 9-13-88. now abandoned

BACKGROUND OF THE INVENTION

This invention relates to a computer controlled, raster scanned video display system for presenting a representation of a three-dimemsional object to an observer of a video display apparatus. More particularly, this invention relates to a computer controlled, raster scanned video display system having a Z-buffer and a frame buffer, in which the Z-buffer is cleared by an improved method and appparatus.

Computer controlled video display systems which utilize the conventional raster scan technique in their operation, typically present a representation of a three-dimensional object to an observer by, among other things, utilizing a Z-buffer which contains the information that indicates whether one object on the screen (video display apparatus) is in front of or behind another object. The Z-buffer contains information for each pixel on the screen to indicate whether the object will be hidden (e.g. when behind another object or surface) or can be seen.

The conventional computer controlled video display systems typically have a frame buffer and separate Z-buffer, each of which have a plurality of memory locations which are mapped to the plurality of pixel locations on the video display apparatus. The frame buffer is typically a random access memory which is implemented using video random access memory (VRAM) which hold the digital representation of the color and intensity for each pixel in the image. The Z-buffer is also typically a random access memory (RAM) which is typically implemented using dynamic RAM (DRAM) that holds one number for each pixel in the frame buffer. The Value of this "Z" number indicates the distance between the observer and the object being displayed at the pixel. In a typical implementation, a small Z value indicates that the object is closer to the observer, and hence a large Z value indicates that the object is further away from the observer and hence may be hidden by objects which are closer to the observer (having smaller Z values). Of course, it is also possible to have an alternative system where a large Z value indicates that the object is closer to the observer.

The conventional process of updating or clearing a Z-buffer according the the prior art will now be described with reference to FIG. 1. The graphics update controller will typically have two principal modes of operation, which are clearing a screen region (and hence "clearing" the corresponding region of the Z-buffer) and updating the buffers to provide for a new image on the screen of the video display apparatus. FIG. 1 shows in block diagram form a high performance graphics system of the prior art which is part of a computer system. The graphics subsystem includes a graphics update controller 1 (which may alternatively be the main CPU of the computer system). The graphics system further includes a Z-buffer 2 and a frame buffer 3. The graphics update controller 1 of FIG. 1 controls the updating of the frame buffer 3 and the Z-buffer 2 and also controls the refreshing of both buffers and of the video display apparatus. As shown in FIG. 1, the Z-buffer 2 is typically a collection of dynamic random access memory (DRAM) chips and the frame buffer 3 is typically a collection of video random access memory (VRAM). The memory buffers are refreshed by the graphics update controller using well known conventional techniques. Using well known techniques, the video display apparatus is refreshed (to write the image represented by the pixel values in the frame buffer onto the screen of the video display apparatus) by reading pixel values out of the frame buffer 3 onto the bus 8 which is coupled to the video display apparatus. The graphics system shown in FIG. 1 is a conventional graphics system found on many high performance workstations. Other well known graphic subsystems utilizing a Z-buffer along with a frame buffer are well known and operate in a similar manner as the graphic system shown in FIG. 1.

The graphics update controller 1 (or the main CPU of the computer system), when it is updating the buffers to present a new image on the video display, will typically calculate new pixel values and new Z values for the pixels along a raster scan line horizontally across the video display apparatus on a line basis. Using the conventional X, Y and Z coordinates associated with computer controlled video display systems, a scan line has a constant Y value but a changing X value as the image is drawn from one side of the screen to the other. For example, if the scan line on a video display apparatus has a resolution of 512 Pixel locations (i.e. X may have a value equal to any integer between and including 1 to 512) then the graphics update controller 1 calculates in the conventional manner a new pixel value and a new Z value for each pixel location across the scan line and then proceeds to the next line, repeating the process. Each pixel location already displayed on the display apparatus (e.g. a computer monitor utilizing cathode ray tube technology) will have an old Z value and an old pixel value which are stored respectively in the Z-buffer and the frame buffer. For each pixel location, the graphics update controller 1 performs the following four steps during the updating of the Z-buffer 2 and the frame buffer 3. First, the graphics update controller 1 reads the old Z value in the Z-buffer 2 for the current pixel location. For that current pixel location, a new Z value and a new pixel value are also being computed by the graphics controller 1. The graphics controller 1 reads the old Z value from the Z-buffer 2 by applying (over the address and control bus 4) an address for the current pixel location as well as control signals to select the Z-buffer, thereby causing the Z-buffer to output Z data on interconnect bus 6 which is coupled to data bus 5 to thereby provide the old Z value over the bus 5 to the graphics update controller 1. Next, the graphics update controller 1 compares to the old Z value read from the Z-buffer 2 to the new Z value being calculated for the current pixel location to determine if the current pixel being calculated is closer to the observer than the pixel already stored in the frame buffer 3. Next, the new pixel value is written into the frame buffer 3 for the current pixel location only if the new pixel for that pixel location is closer to the observer than the pixel already stored the frame buffer 3. If the new pixel is behind the old pixel, then the graphics controller 1 proceeds to the next pixel location (thereby, not updating the buffers by leaving the old pixel value in the frame buffer and the old Z value in the Z-buffer) and reverts back to the first step in the process for that next pixel location. If the new pixel is in front of the old pixel for the current pixel location, then that pixel location is updated. In a typical implementation, the graphics update controller 1 determines whether to update the current pixel location by determining whether the new Z value for the current pixel location is less than the old Z value for that pixel location; if it is less than, the graphics update controller 1 addresses the appropriate pixel location for the current pixel via address and control bus 4 (with appropriate address and control signals to select the frame buffer 3) while at the same time supplying the new pixel value over the data bus 5 which is coupled to the interconnect bus 7 to supply the data for the new pixel value to the frame buffer 3. In the last of the four step process, the graphics update controller 1 writes the new Z value for the current pixel location into the Z-buffer 2 when the new pixel at that location is closer to the observer than the old pixel which was stored in the frame buffer 3. The graphics update controller 1 applies the address corresponding to that current pixel location to the Z-buffer along with control signals to select the Z-buffer via the address and control bus 4 while also supplying the new Z value over the data bus 5 and hence over the interconnect bus 6.

This four step process is then repeated for the next pixel along the scan line. Thus, for the next pixel location, the new pixel value is computed along with the new Z value for that pixel location. Then, the old Z value is read from the Z-buffer 2 and compared with the new Z value to determine whether, for that pixel location, the new pixel is closer to the observer than the old pixel. If the new pixel is closer than the old pixel, then the frame buffer is updated with the new pixel value and the Z-buffer is updated with the new Z value.

In the prior art, a region of the Z-buffer is cleared in order to clear the corresponding region of the screen by writing the largest possible Z value (and hence farthest from the observer) into all locations selected for clearing. That is, in a separate sequence of steps, the prior art graphics systems such as that shown in FIG. 1, will clear a region of the screen by writing the largest possible Z values into all pixel locations selected for cleaning in that region. In addition, the typical graphics systems of the prior art, such as that shown in FIG. 1, will also write the background color and intensity (e.g. black) for all pixel values into the frame buffer 3 for all pixel locations in the region selected for clearing. In this way, when that region previously selected for clearing is updated using the four step process described above, new pixel values will be written into the pixel locations cleared in the clearing operation since the new Z value is for those new pixels will almost certainly represent pixels in front of the pixels drawn during the clearing sequence.

The prior art technique for clearing a portion (or all) of the Z-buffer involves several steps. The first step of the process involves determining the pixel locations in the region to be cleared. The graphics update controller will typically be responding to graphics commands from the main software controlling the computer system. Those graphics commands will include two principal commands for the graphics controller—update and clear. The clear command will include information, typically on a line by line basis, which indicates the region to be cleared. Typically, the starting and ending pixel locations for each line to be cleared will be specified with the clear command. Then the graphics update controller 1 will write the largest possible Z value into the Z-buffer for all pixel locations for each line to be cleared. The graphics update controller 1 will also write the background color and intensity into the frame buffer for all pixel locations selected for clearing.

In the above-described prior art technique for clearing a region of the Z-buffer and thereby clearing a region of the screen, the graphics update controller 1 must write the largest possible Z value for each pixel location into the Z-buffer 2. It will be appreciated that each DRUM in the Z-buffer 2 is a 1-megabit chip arranged in an array of 256 kilobits by four. There are, as shown in FIG. 1, five such 1-megabit chips. Thus, the graphics update controller 1 may select all five DRAM chips of the Z-buffer 2 and may write (or read) to all five chips simultaneously by providing the appropriate, well known control signals to each DRAM chip (e.g. RAS, CAS and write enable (WE)). On the other hand, it will be appreciated that the graphics update controller 1, may write to the twenty VRAM chips simultaneously in the frame buffer 3 thereby writing four times as much information in approximately the same time as can be written to the Z-buffer 2. Moreover, the frame buffer 3 uses VRAM chips which have special well known modes that allow writing at multiple locations in the same chip in the memory cycle while DRAMs do not have these special modes. Thus, even if the number of DRAMs used in the Z-buffer is the same as the number of VRAMs used in the frame buffer, the frame buffer, implemented in VRAMs, will allow more memory storage locations (corresponding to more pixel locations) to be changed in a given period of time than the Z-buffer.

The prior art graphics system shown in FIG. 1, which is typically found on high performance graphics workstations, provides high performance 3-dimensional representations of images on a computer screen. However, these prior art systems suffer from a delay in clearing a region of the screen due to the need to clear the corresponding region of the Z-buffer.

Accordingly, it is an object of the present invention to provide a method for clearing a region of the Z-buffer which increases the speed of clearing the corresponding region of the screen of the video display apparatus. More particularly, it is an object of the present invention to provide an efficient method for clearing of a region of the screen by writing a plurality of bits into the faster buffer, which is typically the frame buffer, which plurality of bits invalidates the Z values for the pixel locations in the region selected for clearing.

SUMMARY OF THE INVENTION

A method and an apparatus for clearing a region of the Z-buffer and hence a corresponding region of the screen of a video display apparatus is disclosed for use in a raster scan, computer controlled video display system for presenting a representation of a three-dimensional object on the video display apparatus, such as a computer monitor, to an observer of the video display apparatus. The computer controlled video display system includes a Z-buffer for storing Z values and a frame buffer for storing pixel values. The frame buffer and the Z-buffer operates at two different speeds because more bits of data may be changed during a given period of time in one buffer than in the other buffer. Specifically, more bits of data and/or more memory storage locations (corresponding to more pixel locations) may be changed during a given period of time in the frame buffer than in the Z-buffer.

In the method according to the present invention, a bit is written into the frame buffer (the faster buffer) for each pixel location which has been selected for clearing in the region of the video display which will be cleared. These bits which are written into the frame buffer will invalidate the Z values for the pixel locations in the region selected for clearing. Next, new pixel values and Z values are calculated for those pixel locations and the frame buffer and Z-buffer will be updated with those new values at those pixel locations without preforming a Z comparison (e.g. comparing old and new Z values for each pixel location).

The frame buffer will typically be a collection of VRAM chips which have a plurality of memory storage locations that are mapped in the conventional, well known manner to the plurality of pixel locations on the video display apparatus. The frame buffer will also include a Z invalidity memory plane that has a plurality of memory storage locations that are also mapped to the pixel locations of the video display apparatus such that each memory storage location of that Z invalidity memory plane will be mapped to correspond to one specific pixel location of the video display apparatus. Storing a '1' into a particular memory location of the Z invalidity memory plane will activate the Z invalidity bit for the pixel location corresponding to that particular memory location and will thereby invalidate the Z value in the Z-buffer corresponding to that pixel location. The VRAM chips will be arranged in an array where M chips can be addressed and written to simultaneously. The Z-buffer will typically be a collection of DRAM chips arranged in array where N chips can be addressed and written to simultaneously. In a typical implementation, the frame buffer will permit more bits of data (and hence more pixel locations) to be changed during a given period of time than the Z-buffer because the number of chips M in the array of VRAM chips will exceed the number of chips N in the array of DRAM chips for the Z-buffer. Even if the number of DRAM chips used in the Z-buffer is the same as the number of VRAM chips used in the frame buffer, the frame buffer will be a faster buffer when the VRAM chips are operated in the mode ("block mode") that allows writing at multiple locations in the same chip during the same memory cycle. When the block mode feature is used with the VRAM chips in the frame buffer, the Z-buffer (using DRAMs) will typically permit Q distinct Z values to be addressed and written to simultaneously while the frame buffer will allow P distinct pixel values to be addressed and written to simultaneously, and the frame buffer will be faster (even if the number of VRAM and DRAM chips are the same) because P is greater than Q.

BRIEF DESCRIPTION OF THE DRAWINGS

FIG. 1 shows a prior art graphics system of a computer workstation for use in a computer controlled video display system.

FIG. 2 is a schematic diagram of the graphic system of the present invention where the bits invalidating Z values in the Z-buffer are stored in a separate portion of the frame buffer.

FIG. 3 is a flow chart with a method of the present invention for updating the Z and frame buffers.

FIg. 4 shows the arrangement of information in the frame buffer (VRAM) and the Z-buffer (DRAM).

FIG. 5 is a flow chart showing a method of the present invention for clearing the Z-buffer.

DETAILED DESCRIPTION OF THE PREFERRED EMBODIMENT

The subject invention will be described with reference to the preferred embodiment and the accompanying figures which illustrate the invention. Numerous specific details are described to provide a thorough understanding of the invention. However, these details are merely to illustrate the invention and are not to be construed as essential limitations of the invention. In other instances, certain well known conventional details are described briefly in order not to unnecessarily obscure the present invention in detail. In the drawings, like elements are labelled with like reference numerals.

FIG. 2 shows the architecture of the graphics system of the present invention which performs the method of the invention. The graphics system of FIG. 2 includes a graphics update controller 10 (which alternatively may be the main CPU of the computer system), a Z-buffer 2 and a frame buffer 15. As shown in FIG. 2, the Z-buffer may be five 1-megabit DRAM chips each of which is arranged as having 256 kilobits by 4 bits. Thus, each chip in the Z-buffer 2 can have a 4 bit value read from or written to the chip simultaneously. The frame buffer 15 as shown in FIG. 2 is comprised of twenty VRAM chips each of which is arranged as having 64 kilobits by 4 bits; a portion of the frame buffer 15 includes a Z invalidity memory plane 16 which is mapped to correspond with the screen of the video display. The Z invalidity memory plane 16 includes a storage bit location for each pixel location of the video display apparatus; however, none of the data in the Z invalidity memory plane 16 is displayed on the display apparatus. As is well known in the art, the frame buffer 15 will include several other memory bit planes, each of which is mapped to and displayed on the video display. Similarly, as is well known in the art, the Z-buffer 2 will include several bit planes mapped to the screen such that each bit in a bit plane will be mapped to a particular pixel location on the screen. FIG. 4 shows an arrangement where each pixel values for a pixel location is represented by seven binary bits and that pixel location also includes a memory storage location for the bit which can invalidate the Z value in the Z-buffer at that pixel location. It will be appreciated that the bit mapping and address control for the Z-buffer 2 and the frame buffer 15 use the same techniques as in the conventional prior art system shown in the FIG. 1 for the Z-buffer 2 and the frame buffer 3.

As shown in FIG. 2, the Z-buffer 2 is coupled to the graphics update controller 10 by the Z-buffer address and control bus 12 which provides address and control signals from the graphics update controller 10 to the Z-buffer 2. The Z-buffer 2 is also coupled to a graphics update controller 10 by a bidirectional Z data bus 13 which provides Z data to and from the Z-buffer 2.

The frame buffer 5 is coupled to the graphics update controller 10 by the frame buffer address and control bus 11 which provides address and control signals to the frame buffer 15 from the graphics update controller 10. The frame buffer 15 is also coupled to the graphics update controller 10 by the bidirectional frame buffer data bus 14 which provides frame buffer data to and from the frame buffer 15. The frame buffer 15 is coupled to the video display apparatus by bus 8 which is controlled in the conventional manner by the graphics update controller 10. The graphics update controller 10 refreshes the video display apparatus (to write the image represented by the pixel values in the frame buffer onto the screen of the video display apparatus) using well known techniques by reading pixel values out of the frame buffer 15 (except for the portion 16 of the frame buffer) onto the bus 8 which is coupled to the video display apparatus.

As shown in FIG. 2, the Z-buffer 2 and the frame buffer 15 each have a separate data bus (Z data bus 13 and frame buffer data bus 14 respectively). Similarly, the Z-buffer 2 and the frame buffer 15 each have a separate address and control bus (address and control bus 12 and address and control bus 11 respectively). However, it will be appreciated that the present invention may alternately be implemented using a common data bus and a common addresss and control bus such as that shown in FIG. 1. Specifically the frame buffer 15 shown in FIG. 2 will be substituted for the frame buffer 3 shown in FIG. 1, and the graphics update controller 10 will be substituted in place of the graphics update controller 1 shown in FIG. 1 to implement a system of the invention using a common data bus and a common address and control bus for the Z-buffer and the frame buffer. In this alternative implementation of the present invention, the graphics update controller 10 will be substantially identical to the graphics controller 1 except it will perform the process shown in FIGS. 3 and 5 rather than the prior art process described above.

The method of the present invention is depicted in FIGS. 3 and 5 which show the process for efficiently and rapidly clearing a region of the screen by clearing the corresponding region of the Z-buffer. Before describing the detailed steps shown in FIGS. 3 and 5, a general description of the method will be provided. A method of the invention is utilized in a raster scanned, computer controlled video display system, such as that shown in FIG. 2, which includes a Z-buffer 2 for storing Z values and a frame buffer 15 for storing pixel values. The Z value for each pixel location indicate the distance between the observer and the object being displayed at the pixel location on the video display apparatus. The method of the present invention works with the technique of perfoming Z comparisons to determine whether the new pixel at a particular pixel location is in front of or behind an old pixel at that pixel location. According to the method of the invention, a bit is activated (e.g. a 1 is written into that bit location) for each pixel location in the region to be cleared. Then, new pixel values and new Z values are stored in those pixel locations without performing a Z comparison and for each pixel location which is updated with new pixel information in the region which was cleared, the invalidity bit is disabled. Because more VRAM chips are used in the frame buffer than the DRAM chips used in the Z-buffer, it is possible to update more bits of data during a given period of time in the frame buffer than in the Z-buffer. Therefore, a region of the Z-buffer may be cleared more quickly by writing Z invalidity bits into the VRAM of the frame buffer than by writing the largest possible Z values into the Z-buffer 2. Even if the number of DRAM chips used in the Z-buffer is the same as the number of VRAM chips used in the frame buffer, the frame buffer will be a faster buffer when the VRAM chips are operated in the mode ("block mode") that allows writing at multiple locations in the same chip during the same memory cycle.

The method according to the present invention begins at step 30 (Node A) as shown in FIG. 5. It will be appreciated that the nodes used in the figures show interconnections between processing steps. Step 30 is entered when the graphics update controller 10 begins to execute a clear region command. This command may be generated by the user directing the computer to clear the screen or may be generated as a result of a program indicating that a region of the screen is to be cleared. That is, the graphics update controller 10 will be executing the clear region method as a result of the same commands that cause the prior art graphics update controller 1 to begin executing the prior art clear region method. The clear region command will also include, as in the prior art, the parameters which indicate the size and location of the region to be cleared. For example, the parameters may be four X, Y coordinates which form a rectangular region on the screen. More often, the graphics update controller 10 will receive and execute the clear region command for each raster scan line (row of the video display) and hence will receive (along with the clear region command) the starting X location and the ending X location along a constant Y (i.e. a single scan line) which is to be cleared. Following step 30, the graphics update controller 10 activates the Z invalidity bit in the faster buffer (the frame buffer 15) for each pixel location in the clear region, from the starting X location to the ending X location. That is, in step 31, the graphics update controller 10 will write a 1 into the Z invalidity bit location in the frame buffer 15 for each pixel location in the clear region. The 1 for each Z invalidity bit location activates in this particular embodiment the Z invalidity bit for the pixel location corresponding to that Z invalidity bit location; of course, a 0 in that Z invalidity bit location may alternatively activate the Z invalidity bit for that location while a 1 disables the Z invalidity bit so it is not active. As shown in FIG. 5, after writing a 1 into the Z invalidity bit locations in the Z invalidity memory plane 16 of the frame buffer 15 for each pixel location in the clear region, the method proceeds to step 32, in which the graphics update controller 10 will write the background pixel values into each pixel location in the cleared region. Following step 32, the graphics update controller 10 proceeds to step 43 (Node B) which proceeds immediately into the wait state 44 in which the graphics update controller 10 waits for the next graphics command, which may be either another clear command (in which case it proceeds to Node A and then to steps 31 and 32 as described above) or an update command, in which case it proceeds to Node C to perform the update routine shown in FIG. 3. The execution of an update command using the method of the invention will now be described with reference to FIG. 3.

Step 33 is the first step in the execution of an update command. This command will be generated externally, as in the prior art, as a result of a program directing that a region of the video display be modified to present a new image. The graphics update controller 10 will begin to execute the update command (starting at step 33) as a result of the same commands that cause the prior art graphics update controller 1 to begin updating the frame buffer 3. The update command, as in the prior art, will also include the parameters necessary to compute, in the conventional manner, the new pixel values and the new Z values and the pixel locations for those new values. Typically, the update command, as in the prior art, will be executed on a line by line basis with those parameters such that starting and ending pixel locations will be provided with the update command; the ending pixel location will be used to determine when the update command has been fully executed. Thus, in step 33, the graphics update controller 10 computes the new Z value and the new pixel value for the current pixel location.

Following step 33, the graphics update controller 10 proceeds to step 35 in which it determines whether, for the current pixel location, the invalidity bit is active. In the preferred embodiment, the invalidity bit which invalidates the Z-buffer value, will be active when a 1 is written into the Z invalidity bit location corresponding to the current pixel location. On the other hand, the invalidity bit will not be active when a 0 is found in the location of the Z invalidity memory plane 16, which location corresponds to the current pixel location. The graphics update controller 10 checks the invalidity bit for the current pixel location by applying address and control signals over the address and control bus 11 to read the value stored in the memory storage location of the Z invalidity memory plane 16 which corresponds to the current pixel location. The data from that bit location in the Z invalidity memory plane 16 of the frame buffer 15 is supplied to the graphics update controller 10 over the frame buffer data bus 14. If the invalidity bit of the current pixel location is active, the graphics update controller then proceeds to step 37. If, on the other hand, the invalidity bit for the current pixel location is not active, the graphics update controller 10 proceeds to step 36. In step 36, the graphics update controller 10 reads the old Z value for the current pixel location from the Z-buffer 2. Thus, the graphics update controller 10 applies address and control signals over the bus 12 to address the appropriate locations of the Z-buffer 2 and obtains the old Z value for the current pixel location from the Z-buffer 2 via the Z data bus 13. Then the graphics update controller proceeds to step 40.

In step 40, the graphics update controller 10 compares the old Z value to the new Z value for the current pixel location. If the new Z value represents a pixel being in front of the old pixel represented by the old Z value, then the test in step 40 "passes" and the graphics update controller 10 proceeds to step 37. On the other hand, if the old pixel represented by the old Z value at the current pixel location is in front of the new pixel represented by the new Z value, then the test in step 40 fails and the new pixel data will not be written into the frame buffer nor will the new Z value be written into the Z-buffer because the old pixel hides the new pixel and therefore should not be shown in the video display screen. In this instance (a fail from the Z comparison in step 40), the graphics update controller 10 will proceed from step 40 to step 41 in which it moves to the next pixel location along the same raster scan line. Following step 41, the graphics update controller 10 will go to step 42 in which the controller 10 determines whether the current update command has been fully executed. Typically, the controller will make that determination by comparing the X value of the ending pixel location (supplied to the controller 10 with the current update command) to the X value of the current pixel location. If the X value of the current pixel location exceeds the X value of the ending pixel location, then the current update command has been fully executed ("end") and the controller 10 proceeds to Node B (step 43) which leads to step 44 in which the controller 10 waits for the next graphics command. If the current update command has not been fully executed then the controller 10 proceeds from step 42 to step 33 and the process repeats through the steps shown in FIG. 3.

Step 37 may be reached either from step 35 or step 40 as described above. In either case, during step 37, the graphics update controller 10 will write the new pixel data value into the frame buffer 15 and the new Z data value into the Z-buffer 2 for the current pixel location. This operation is of course similar to the operation performed in the prior art graphics system shown in FIG. 1. Following step 37, the graphics update controller 10 writes a 0 into the Z invalidity bit location for the current pixel location to disable the Z invalidity bit in the Z invalidity memory plane 16. It is also possible to combine steps 37 and 38 such that when the graphics update controller 10 writes a new pixel value into the frame buffer 15 it also writes a 0 into the Z invalidity bit location for the current pixel location. Following step 38, the graphics update controller 10 proceeds to step 39 in which it performs the same operation described above with respect to step 41. Following step 39, the graphics update controller 10 recirculates back to step 42, which was described above.

FIG. 4 shows a possible arrangement of data in the frame buffer which contains the pixel values and the bits for invalidating the Z-buffer values (a VRAM) and for the Z-buffer. As shown in FIG. 4, each pixel value is represented by seven digital bits allowing the pixel value to have any decimal value from 0 to 127. Each pixel location, such as pixel location $X_1$, $Y_1$ will include a bit for invalidating the Z-buffer value corresponding to that same pixel location. Thus, as shown in FIG. 4, when a 1 is written to the bit location in the VRAM for pixel location $X_1$, $Y_1$, the Z value in that pixel location will be invalid until a 0 is written into the Z invalidity bit for that pixel location.

The foregoing invention has been described with reference to certain specific details which were presented for a thorough understanding of the invention. It will be appreciated that numerous modifications and applications may be made of the present invention without departing from the scope and spirit of the invention. For example, other arrangements of the memory chips for the frame buffer and the Z-buffer may be provided; moreover, other types of memory may be provided for the frame buffer or the Z-buffer.

What is claimed is:

1. A method for clearing a portion of a Z-buffer in a raster scanned, computer controlled video display system having a frame buffer and said Z-buffer and a graphics update controller coupled to said frame buffer by a frame buffer data bus to transfer data between said graphics update controller and said frame buffer, and said graphics update controller being coupled to said Z-buffer data bus to transfer Z data between said graphics update controller and said Z buffer, said frame buffer and said Z buffer operating at two different speeds such that more bits of data may be changed during a given of time in said frame buffer than in said Z-buffer, said Z-buffer being comprised of dynamic random access memory chips arranged in an array where N chips can be addressed and written to simultaneously such that N distinct bits of Z values can be addressed and written to simultaneously, said method comprising:

writing a first plurality of bits into a plurality of pixel locations into said frame buffer, said first plurality of bits representing the invalidity of the Z values for said plurality of pixel locations, said plurality of pixel locations corresponding to said portion of said Z-buffer being cleared, said frame buffer receiving said first plurality of bits from said graphics update controller through said frame buffer data bus and said frame buffer being comprised of video random access memory chips in an array where M chips can be addressed and written to simultaneously by said graphics update controller, wherein M is greater than N;

writing a second plurality of bits into said plurality of pixel locations into said frame buffer, said second plurality of bits representing the background pixel value;

updating the pixel and Z values for said plurality of pixel locations, said updating occurring without comparing old Z values to new Z values for said plurality of pixel locations; and changing said first plurality of bits to indicate the validity of the Z values to for said plurality of pixel locations after updating the pixel values and Z values for said plurality of pixel locations.

* * * * *